(12) United States Patent
Olbrich

(10) Patent No.: US 7,716,081 B1
(45) Date of Patent: May 11, 2010

(54) TIPPING DEVICE

(76) Inventor: John H. Olbrich, 108 Ivy St., San Diego, CA (US) 92101

( * ) Notice: Subject to any disclaimer, the term of this patent is extended or adjusted under 35 U.S.C. 154(b) by 1258 days.

(21) Appl. No.: 11/239,924

(22) Filed: Sep. 30, 2005

(51) Int. Cl.
*G06Q 20/00* (2006.01)
*G06Q 10/00* (2006.01)
*G06Q 30/00* (2006.01)

(52) U.S. Cl. .......................................... 705/16; 705/1.1
(58) Field of Classification Search ....................... None
See application file for complete search history.

(56) References Cited

U.S. PATENT DOCUMENTS

| | | | | |
|---|---|---|---|---|
| 5,850,077 A | * | 12/1998 | Tognazzini | 235/380 |
| 5,933,812 A | * | 8/1999 | Meyer et al. | 705/15 |
| 6,763,924 B2 | * | 7/2004 | Olbrich | 194/217 |
| 7,124,186 B2 | * | 10/2006 | Piccionelli | 709/225 |
| 7,357,310 B2 | * | 4/2008 | Calabrese et al. | 235/380 |
| 7,457,767 B1 | * | 11/2008 | Dunsmore et al. | 705/17 |
| 2003/0078793 A1 | * | 4/2003 | Toth | 705/1 |
| 2005/0108116 A1 | * | 5/2005 | Dobson et al. | 705/30 |
| 2006/0064373 A1 | * | 3/2006 | Kelley | 705/39 |
| 2006/0143087 A1 | * | 6/2006 | Tripp et al. | 705/15 |
| 2006/0283935 A1 | * | 12/2006 | Henry et al. | 235/380 |

\* cited by examiner

*Primary Examiner*—F. Ryan Zeender
*Assistant Examiner*—Asfand M Sheikh
(74) *Attorney, Agent, or Firm*—Palomar Patent; Calif Tervo

(57) ABSTRACT

A tipping device for dispensing a tip from a patron to a performer, such as in an adult dance venue, generally comprises a transaction apparatus including a money receiver at a first location for receiving money for the tip from the patron and a tip dispenser at a second location for dispensing the tip into the air so as to create an entertaining effect. The tip dispenser may be suspended by a winch above the performer. Preferably, the tip is dispensed out of reach of the patron at the first location and such that a patron at the first location may see the performer while the tip is being dispensed. The tipping device may include a spotlight or flashing lights for highlighting the patron during dispensing of the tip.

10 Claims, 2 Drawing Sheets

TIPPING DEVICE

FIELD OF THE INVENTION

This invention relates generally to the field of providing a tip for a performer, and more specifically involves a device for dispensing a tip from a patron to a performer.

SUMMARY OF THE INVENTION

The invention is a tipping device for dispensing a tip from a patron to a performer, such as in an adult dance venue. The tipping device generally comprises a transaction apparatus at a first location for receiving money for the tip from the patron and a tip dispenser at a second location, for dispensing the tip towards the performer.

In an exemplary embodiment, the tip dispenser is suspended by a winch, pole, or wall mount above or beside the performer and the tip is dispensed towards the performer into the air so as to create an entertaining effect. Preferably, the tip is dispensed out of reach of the patron at the first location and such that a patron at the first location may see the performer while the tip is being dispensed.

An optional feature of the tipping device includes a spotlight or flashing lights highlighting the patron during dispensing of the tip.

Other features and many attendant advantages of the invention will become more apparent upon a reading of the following detailed description together with the drawings wherein like reference numerals refer to like parts throughout.

DETAILED DESCRIPTION OF THE INVENTION

Figure 1:
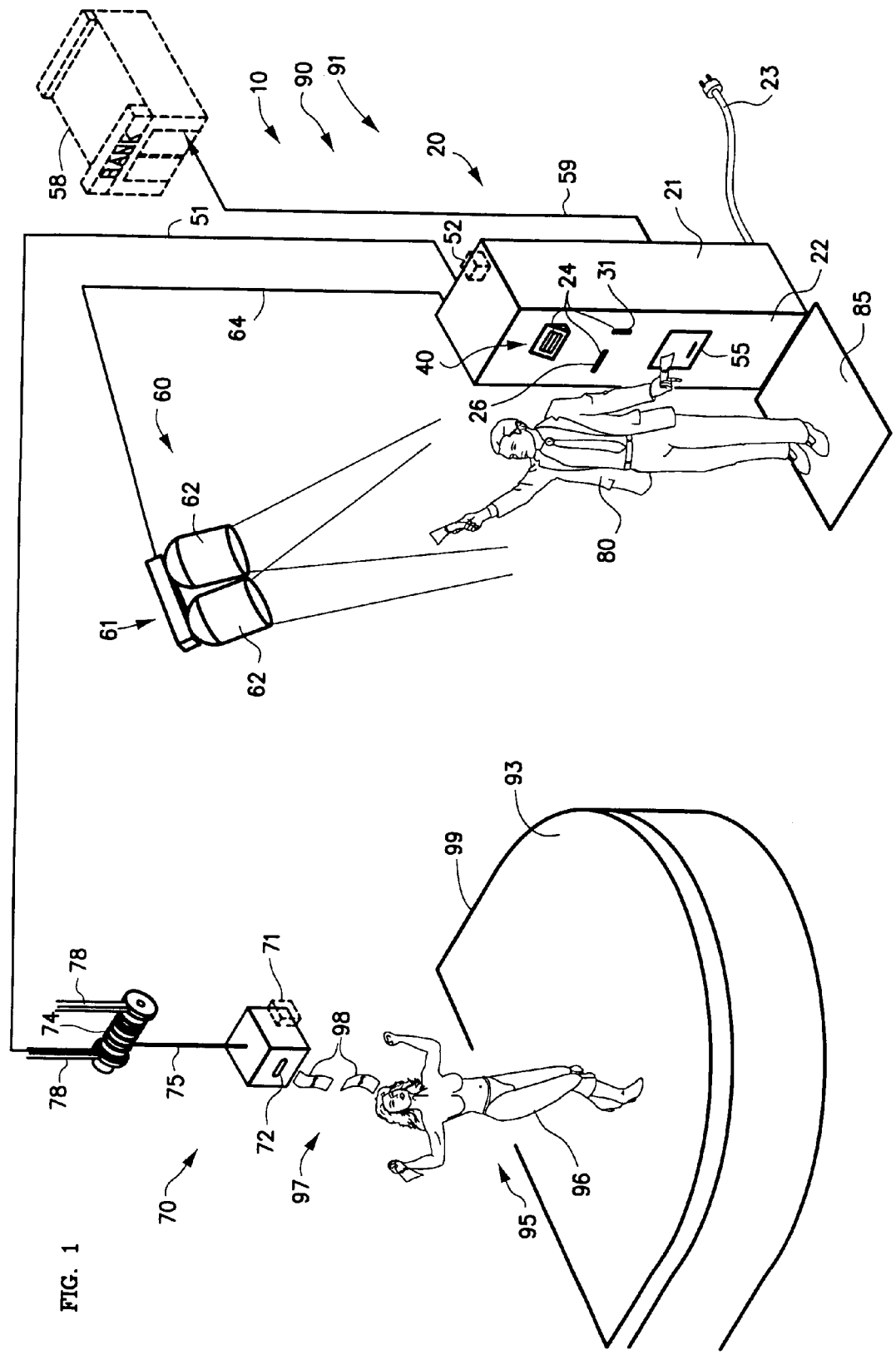
FIG. 1 is a diagrammatic perspective view of an exemplary embodiment of the tipping device of the invention.
Figure 2:
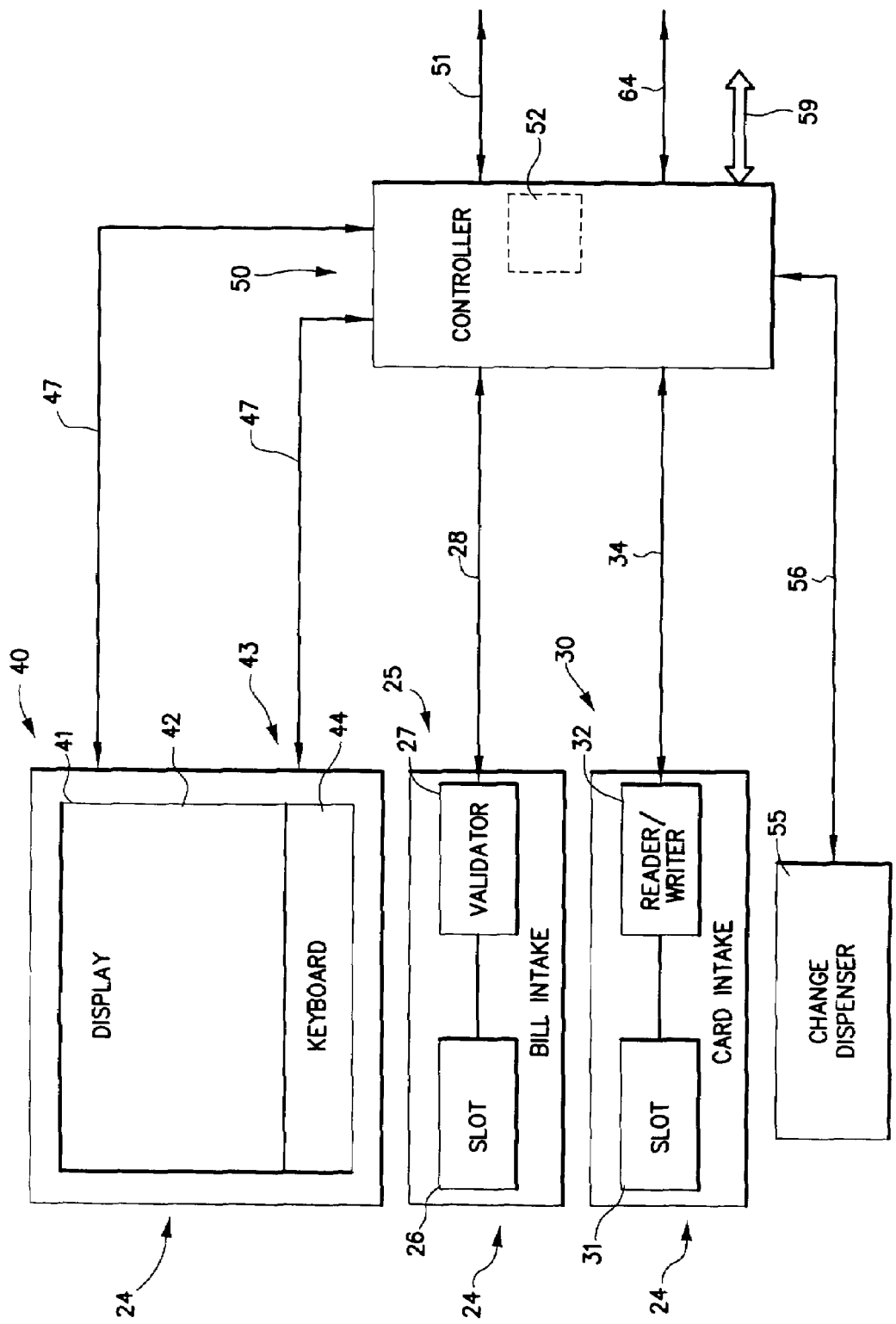
FIG. 2 is a simplified block diagram of the logic operation of the transaction apparatus of the tipping device.

With reference now to the drawings, there is shown in FIG. 1 a diagrammatic perspective view of an exemplary embodiment of the tipping device 10 of the invention, and in FIG. 2 there is shown a simplified block diagram of the logic operation of the transaction apparatus 20 of tipping device 10. In FIG. 1, tipping device 10 is shown dispensing a tip 97 in an establishment 90 such as an adult dance venue 91 including a stage 93. However, tipping device 10 could be located anywhere where tipping of performances or services is encouraged.

Tipping device 10 allows a patron 80 to tip a performer 95 in a noticeable and entertaining manner and in a manner that draws attention to the patron 80 and encourages tipping by others. Performer 95 may be anyone that patron 80 desires to tip for services or performance, such as a wait person, bartender, singer, or dancer 96, shown.

Tipping device 10 generally comprises a transaction apparatus 20 and a tip dispenser 70. Patron 80, at a first location 85, provides money for the tip 97 to transaction apparatus 20. Transaction apparatus 20 receives the money for the tip 97 from patron 80, communicates the receipt of the money to tip dispenser 70 that then dispenses tip 97.

Transaction apparatus 20 includes several components attached to each other and in communication, such as housed together in a cabinet 21. Transaction apparatus 20 generally includes multiple means 24 for receiving money, a display/input module 40, a controller, 50, and change dispensing module 55. The composition and functioning of most of these components can be found in the prior art and are well-known to those reasonably skilled in the art of money-receiving machines. Therefore, the construction of these components is not described in detail in this disclosure. Cabinet 21 may be of any convenient shape and is depicted here as an upright rectangular prism taller than an average person and shaped as a cabinet 21. Cabinet 21 includes a front panel 22 presenting interface components for patron 80. Front panel 22 may resemble a modern automatic teller machine (ATM) in appearance.

Controller 50 communicates with money receiving means 24, a touch/display input module 40, change dispensing module 55, tip dispenser 70, and outside banking or credit companies 58, including the bank associated with accounts from transaction apparatus 20. Controller 50 would typically be a computer including a programmable logic controller, or PLC, such that establishment 90 has some control over input and output parameters, that is, what monies are accepted in exchange for what tip 97 and change. This technology is well-known in that art. Controller 50 communicates with banking/credit companies 58 on one or more communication channels, such as line 58.

Touch/display input module 40 includes a display device 41 including a display 42 and input means 43, such as a keyboard 44 or display 42 including touch-screen capabilities such as commonly employed on ATMs. Display device 41 communicates with controller 50 via transmission cables 47. Display device 41, using display 42, prompts patron 80 how to operate tipping device 10 and informs patron 80 of the current settings, that is, what will be dispensed as tip 97 and as change for a given money input. When tipping device 10 is not in active use, display 42 may be used as an advertising display or to provide other messages to patrons 80.

The electricity for running all functions of transaction apparatus 20 is provided through power cord 23, which would typically have a plug (not shown) adapted for being plugged into a wall outlet. Potential functions, envisioned but not illustrated herein, include general lighting of front panel 22 and music or video output for enticing customers to approach transaction apparatus 20.

Money receiving means 24, such as bill intake module 25, card intake module 30, and touch/display input module 40, receive the money from patron 80 for the tip 97.

Bill intake module 25 may be of conventional type as is well-known in that art. Bill intake module 25 receives money, such as a bill of currency, from patron 80, and communicates, such as via wire 28, the receipt thereof to controller 50. Bill intake module 25 generally includes a slot 26 for receiving a bill of currency, such as a dollar bill, from patron 80. Dollar bill is meant to include any denomination such as one, five, ten, twenty, or hundred dollar bills. As is well-known in the art, a drive pulls a bill presented by patron 80 through slot 26 to a validator 27 that determines the denomination of the bill and checks its authenticity. Currency acceptance and validation equipment is well known in the art of automated payment, such as is common in vending machines and self-service payment stations, and is not described in detail herein. Equipment is available that accepts only a single denomination of currency, typically twenty dollar bills, or that can accept a variety of denominations. Either type can be used for tipping device 10 of the present invention.

Card intake module 30 may be of conventional type as is well-known in that art. Card intake module 30 receives a card, such as a debit card, credit card, ATM card or the like, with which or from which patron 80 authorizes money to be paid for tip 97 using display 42 and input means 43, such as keypad 43 or touch display 42, as directed on display 42 or other signage. Card intake module 30 generally includes a card receiving slot 31 and card reader or card reader/writer 32 connected to controller 50 by line 34. Card reader/writer 32 reads cards and writes to cards in a manner well-known in that art. Controller 50 communicates with banking/credit companies 58 on one or more communication channels 59 for receiving money from card transactions as is well-known in that art.

Touch/display input module 40 may be used by patron 80 for direct payment of money to transaction apparatus 20 from banking/credit companies when a card is not required. Patron 80 enters information, such as account numbers, password and amount requested, required by the banking/credit company 58. Controller 50 communicates with banking/credit companies 58 on one or more communication channels 59 for receiving money from card transactions as is well-known in that art.

Controller 50 determines receipt of money from money receiving means 24, amount of tip, and amount of change, and sends a signal, such as on line 51, to tip dispenser 70 to dispense tip 97 to performer 95, and a signal, such as on line 56, to change dispensing module 55 to dispense change to patron 80. Change dispensing module 55 may be of a conventional type as is well-known in that trade and may contain and dispense cash and/or non-cash items, such as coupons, to patron 80. The tip dispensing signal from controller 50 to tip dispenser 70, as with any of the signals, could be a radio signal sent by controller transmitter 52, shown in phantom, to tip dispenser receiver 71, shown in phantom.

Highlighting means 60 is provided for highlighting patron 80, that is for making patron 80 prominent, during dispensing of tip 97 such that performer 95 knows, preferably by seeing, who is providing tip 97.

Highlighting means 60, such as lighting means 61, such as spotlights 62, receives a signal, such as from tip dispenser 70 or from controller 50, such as on line 64, and highlights patron 80 in a distinguishable manner, such as by flashing light on patron 80. Highlighting means 60 could include a noise producer, not shown, such as a siren or bell, located near patron 80 for sounding during dispersal of tip 97 to draw attention to patron 80. Spotlights 62 are supported in any conventional manner, such as from the structure, not shown, of establishment 90.

Tip dispenser 70, containing tip material, such as cash, coupons, or tickets, is of conventional type of dispenser as is well-known in that art. Tip dispenser 70 is disposed so as to dispense tip 97, such as out of a slot 72, to a second location 99, such as in the air at stage 93, such that patron 80 at first location 85 may see performer 95 while tip 97 is being dispensed and, preferably, can see tip 97 being dispensed, but, preferably, such that the dispensed tip 97 is out of reach of patron 80 at first location 85. To this end, in the exemplary embodiment, tip dispenser 70 is located over performer 95, such as over stage 93. Preferably, tip dispenser 70 may be raised and lowered by means, such as a pulley or winch 70. Tip dispenser 70 is suspended from a cable 75, such as on winch 74. Winch 74 is supported, such as by supports 78, to building structure, not shown. Cable 75 may include communication wire 51 from controller 50. Winch 74 is used to move, such as by lowering, tip dispenser 70 for replenishing tip material. Tip 97, such as cash 98, is dispensed by tip dispenser 70 into the air without other support so as to create an entertaining effect. Tip 97 may be dispensed from a high position, such as shown, so as to waft down on performer 95 or may be dispensed, such as from a lower position, and be blown, such as by a blower, not shown, such as by an air stream, into the air. Performer 95 gathers the dispensed tip 97. However, the tip dispenser 70 may be placed on a pole or wall mounted, not shown, rather than by a winch and the tip can be dispensed into a special container, not shown, rather than into the air for the convenience of performer.

In an alternative embodiment, not shown, tip dispenser 70 is located in transaction apparatus 20, such that dispensing slot 72 is on the back, side, or top panel of transaction apparatus 20, preferably out of reach of patron 80. Alternative transaction apparatus 70 abuts stage 93 such that tip 97 is dispensed toward performer 95 and away from patron 80. Patron 80 can see performer 95 while tip 97 is being dispensed.

From the foregoing description, it is seen that the present invention provides an extremely efficient and reliable manner for a patron 80 to tip a performer and simultaneously gain recognition, provide entertainment, and encourage tipping.

Although a particular embodiment of the invention has been illustrated and described, various changes may be made in the form, composition, construction, and arrangement of the parts herein without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A tipping device for dispensing a tip from a patron to a performer; said device comprising:
   a transaction apparatus including:
      money receiving means for receiving money for the tip from the patron at a first location; and
      a controller connected to said money receiving means for producing a signal signifying the tip to be dispensed; and
   a tip dispenser, responsive to receipt of the signal from said controller, for dispensing the tip, which does not include the money received from the patron, toward the performer.

2. The tipping device of claim 1 wherein:
   said tip dispenser dispenses the tip out of reach of the patron at the first location.

3. The tipping device of claim 2 wherein:
   said tip dispenser dispenses the tip out of reach of the patron at the first location and such that the patron at the first location may see the performer while the tip is being dispensed.

4. The tipping device of claim 1 wherein:
   said tip dispenser dispenses the tip such that the patron at the first location may see the performer while the tip is being dispensed.

5. The tipping device of claim 1 further including:
   highlighting means for highlighting the patron during dispensing of the tip.

6. The tipping device of claim 5 wherein:
   said highlighting means comprises a light for lighting the patron in a distinguishable manner.

7. The tipping device of claim 1 wherein:
   said tip dispenser dispenses the tip into the air without other support.

8. The tipping device of claim 1 wherein:
   said tip dispenser dispenses the tip into the air above the performer.

9. The tipping device of claim 1 wherein:
   said controller includes:
      a transmitter for wirelessly sending said signal to said tip dispenser; and
   said tip dispenser includes:
      a receiver for receiving said signal.

10. The tipping device of claim 1 wherein:
    said a tip dispenser dispenses the tip away from the patron.

* * * * *